United States Patent
Baur et al.

[11] Patent Number: 6,016,705
[45] Date of Patent: Jan. 25, 2000

[54] PRESSURE SENSOR WITH PIVOTING LEVER

[75] Inventors: Ulrich Baur, Hirschberg-Leutershausen; Werner Wallrafen, Hofheim; Rudolf Stiller, Niederdorfelden; Norbert Schmidt, Eppstein, all of Germany

[73] Assignee: Mannesmann VDO AG, Frankfurt, Germany

[21] Appl. No.: 09/087,645

[22] Filed: May 29, 1998

[30] Foreign Application Priority Data

Jun. 9, 1997 [DE] Germany .......................... 197 24 293

[51] Int. Cl.[7] ....................................................... G01L 9/02
[52] U.S. Cl. ............................................... 73/725; 73/719
[58] Field of Search ........................... 73/725, 719, 724, 73/718

[56] References Cited

U.S. PATENT DOCUMENTS

| | | | |
|---|---|---|---|
| 3,600,950 | 8/1971 | Bergsma | 73/725 |
| 4,736,155 | 4/1988 | McBrien | 73/719 X |
| 5,443,551 | 8/1995 | Liu | 73/725 |
| 5,693,887 | 12/1997 | Englund et al. | 73/706 X |

FOREIGN PATENT DOCUMENTS 2 188 155  9/1987  United Kingdom ................... 73/718

OTHER PUBLICATIONS

Horowitz et al., The Art of Electronics, Cambridge University Press, p. 7, 1980.

*Primary Examiner*—Joseph L. Felber
*Attorney, Agent, or Firm*—Martin A. Farber

[57] ABSTRACT

A pressure sensor has a movable diaphragm stretched directly between the annular pressing surfaces of two housing parts, and an electrical measuring device. In an area that is located radially outward as viewed from the pressing surfaces, the diaphragm has a sealing ring that abuts both housing parts. As a result, transverse vibrations of the diaphragm are reliably supported.

24 Claims, 2 Drawing Sheets

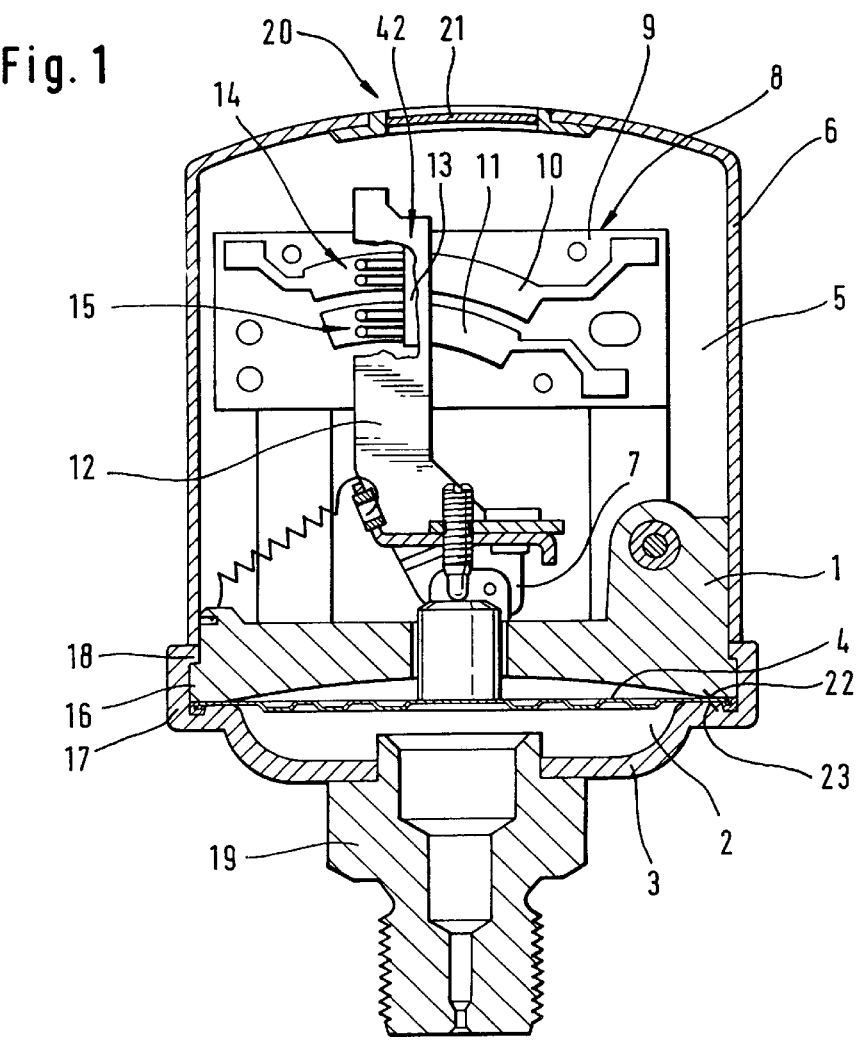
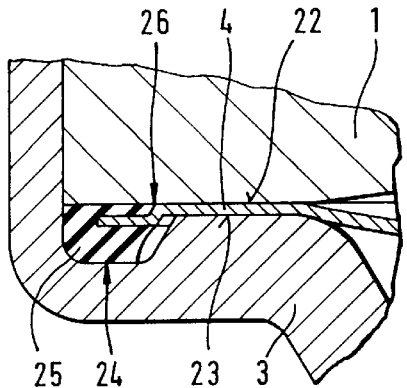
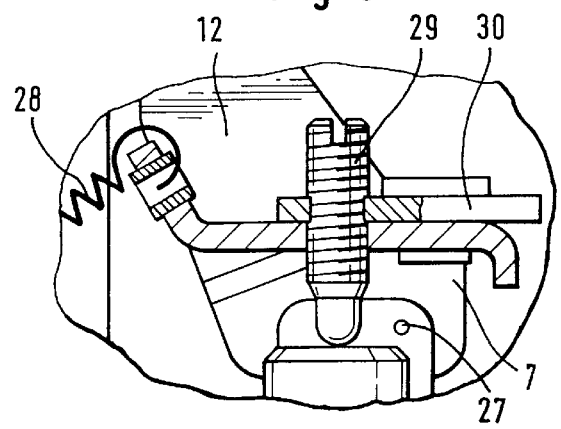

PRESSURE SENSOR WITH PIVOTING LEVER

FIELD AND BACKGROUND OF THE INVENTION

The invention relates to a pressure sensor, especially for a vehicle, for generating electrical signals as a function of the position of a movable diaphragm stretched between a housing part on the measuring chamber side and a housing part on the pressure chamber side, with an electrical measuring device located in a measuring chamber.

Pressure sensors of this kind are frequently used, especially in vehicles, for measuring a relative pressure between the pressure chamber and the measuring chamber, and are known from practice. As a function of the deflection of the pressure membrane, or movable diaphragm, a variable resistance signal is generated and is displayed using a conventional rotary magnet quotient meter. These known pressure sensors do not allow the measured signal to be displayed on contemporary meters without an additional resistance-voltage converter. In addition, the lifetime of the variable resistance located in the measuring chamber, with the resistance having a wire winding tapped by a wiper element, is not satisfactory. In particular, microvibrations that develop both as a result of vehicle vibrations and of pulsations in the measured medium, can result in destruction of the resistance wire. In addition, an oxidation layer that leads to incorrect measured value readings when operation resumes, forms on the wire surface when the vehicle is not in use for a prolonged period of time.

SUMMARY OF THE INVENTION

It is an object of the invention to provide a pressure sensor of the introductorily-mentioned type such that it is simple in construction and that contemporary measurement devices that require a voltage input signal can be controlled directly by it. In addition, it must be especially economical to manufacture and must avoid incorrect measurements as reliably as possible.

This object is achieved according to the invention by the measuring device having a voltage divider circuit containing a potentiometer.

A pressure sensor of this kind supplies an output signal that is proportional to the deflection of the pressure diaphragm over a very wide range of operating voltages. In addition, the sensor is simple and economical to manufacture and is characterized by a high degree of reliability over a long period of time.

The dimensions of a pressure sensor of this kind can advantageously be kept especially small if the potentiometer is a rotary rheostat resistance loop path located in a plane. As a result, the contact with a wiper that taps the resistance loop path is especially simple when the potentiometer has a second low-ohmage wiping path parallel to the resistance wiping path as a contact path for the wiper. Preferably the second wiper path is connected with a resistor wired in series to protect the wiper. In an especially favorable manner, the size of the pressure sensor is further reduced by virtue of the fact that the wiper paths are located approximately perpendicularly with respect to the diaphragm.

A high degree of contact reliability, even during vibration of the sensor system, is advantageously achieved by virtue of the fact that the wiper for tapping the wiper paths is spring-elastic. Contact reliability is preferably further increased, especially during vibrations that can cause the wiper to lift briefly off the wiper path, if the wiper contacts the wiper paths with a plurality of wiper fingers.

A pressure sensor according to the invention is especially wear-resistant and protected against oxidation and is also economical to manufacture if the potentiometer of the measuring device has a resistance made of conducting plastic.

Depending on the manufacturing method that is preferably employed, however, it can also be advantageous for the potentiometer of the measuring device to have a sheet resistance. The sheet resistance is preferably a thick-layer resistance, with the resistance and conducting traces being printed on a ceramic carrier and burned into the latter.

It is especially advantageous, especially when using a pressure sensor according to the invention in a motor vehicle, for the measuring device, upon a deflection of the diaphragm by an applied supply voltage of approximately 5 V, to supply an output signal voltage of approximately 0.5 to 4.5 V.

Advantageously the housing part on the measuring chamber side and the housing part on the pressure chamber side each have pressure surfaces that project in an annular fashion on their sides that face the diaphragm so that the diaphragm is reliably tensionable. The diaphragm then preferably abuts the pressing surfaces of the housing parts directly.

As a result of this construction, the pressure sensor according to the invention has no cup springs like those used in known pressure sensors for pretensioning the diaphragm. It is surprising in this connection that the diaphragm is reliably secured between the housing part s with out additional tensioning elements being provided since no cup springs abut the diaphragm, damage to the diaphragm caused by the cup springs and hence incorrect measurements of the pressure sensor as a result of fluctuations in the characteristic are largely avoided. In addition, the diaphragm is secured especially reliably in the radial direction by the pressing surfaces so that transverse oscillations of the diaphragm cannot result in friction against the pressing surfaces and hence cause damage to the diaphragm as well as measurement inaccuracies. By eliminating the cup springs, the pressure sensor according to the invention also becomes economical to manufacture and assemble.

The pressure chamber can be sealed off from the measuring chamber simply by making the surfaces of the diaphragm and the pressing surfaces especially smooth. However, to further increase the tightness of the pressure chamber, according to an advantageous improvement on the invention, one of the housing parts has a depression to receive a sealing ring that is pretensioned against the diaphragm. As a result of this design, even high relative pressures do not lead to incorrect measurements by the pressure sensor according to the invention.

Separate assembly of the sealing ring is avoided in accordance with another advantageous improvement on the invention if the sealing ring is designed so that it surrounds the outer edge of the diaphragm. A sealing ring of this kind can consist of plastic for example and can be injection-molded on the diaphragm.

The sealing ring according to another advantageous improvement on the invention has no direct contact with the pressure chamber if it is located in an area that is located radially outward as viewed from the pressing surface. As a result of this design, chemical or physical influences of the medium in the pressure chamber on the sealing ring are largely avoided. This results in a long lifetime for the sealing ring and hence to a long-lived tightness of the pressure chamber.

The alignment of the diaphragm during assembly is especially simple according to an advantageous improvement of the invention if the diaphragm has a bend that engages the depression in the housing part. In addition this design produces an increase in the dimensional stability of the diaphragm when not assembled.

The pretensioning of the housing parts against one another, according to another advantageous improvement of the invention, is especially economical if one of the housing parts has a flange and the other housing part has a surrounding edge that fits behind the flange by a bead. As a result of this design, the housing parts are pretensioned very uniformly around the circumference as well. In addition, the housing parts are centered with respect to one another during assembly.

According to another advantageous improvement of the invention, contamination of the measuring device can be avoided in simple fashion by locating a pressure-equalizing element in the housing of the measuring chamber. In addition, a pressure-equalizing element of this kind equalizes pressure changes in the measuring chamber, caused by changing ambient temperatures, that can cause a pressure dependence of the measured values. The above equalizing element can be used advantageously, especially for applications in which this temperature dependence is unreliable.

According to another advantageous improvement, the measuring chamber can be designed as a hermetically sealed chamber if the pressure-equalizing element has an elastic membrane. As a result of this design, the membrane permits pressure equalization without gases or dirt being able to adversely affect the function of the measuring device. In addition, as a result of this design, the measuring chamber can be filled with especially dry air for example or with a protective gas to protect the measuring device.

According to another advantageous improvement on the invention, dirt particles can be kept out of the measuring device in simple fashion by providing the pressure-equalizing element with a filter element.

According to another advantages improvement of the invention, the measuring device is protected for the long term against damage caused by dirt or moisture by the pressure-equalizing element having a Teflon membrane.

According to another advantageous improvement of the invention, the tolerances of the measuring device and the membrane can be simply compensated by having a lever that transmits the movement of the diaphragm to the measuring device, and is adjustable in terms of its tilt angle and the length of a lever arm, with an adjusting element for each. By adjusting the tilt angle, a zero point is set on the measuring device, while adjusting the length of one of the lever arms of the lever serves to adjust the steepness of the characteristic curve of the measuring device.

BRIEF DESCRIPTION OF THE DRAWINGS

With the above and other objects and other advantages in view, the present invention will become more clearly understood in connection with the detailed description of preferred embodiments, when considered with the accompanying drawings of which:

FIG. 1 shows a section through a pressure sensor according to the invention;

FIG. 2 shows an enlarged view of the tensioning of a diaphragm of the pressure sensor in FIG. 1;

FIG. 3 is an enlarged view of a lever of the pressure sensor in FIG. 1;

DETAILED DESCRIPTION OF THE PREFERRED EMBODIMENTS

Figure 4:
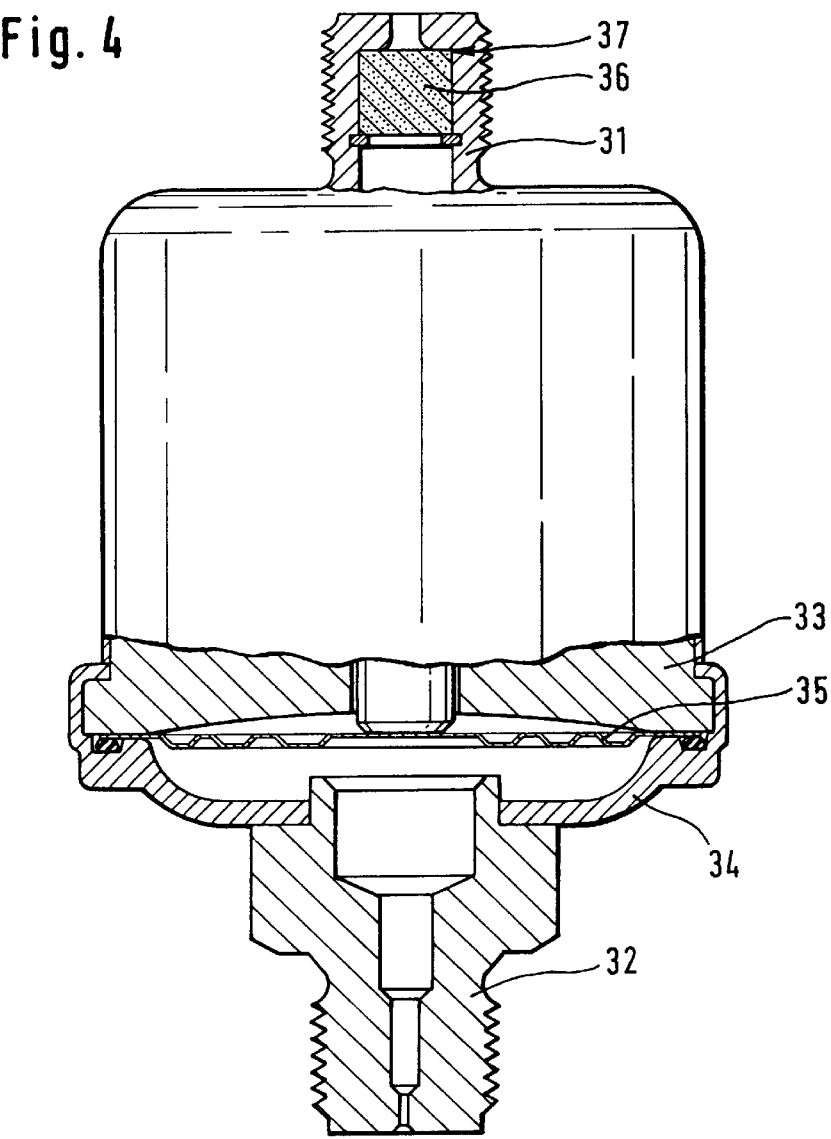
FIG. 4 is another embodiment of a pressure sensor according to the invention in a partial section.

FIG. 1 shows a pressure sensor with a housing part 1 on the measuring chamber side and a housing part 3 on the pressure chamber side that delimits a pressure chamber 2, in a lengthwise section. A diaphragm (or membrane) 4 is stretched between the two housing parts 1 and 3. On its side facing away from the diaphragm 4, the housing part 1 on the measuring chamber side is connected with a pot-shaped housing lid 6 to delimit a measuring chamber 5. The measuring chamber 5 contains a measuring device 8 connected by a lever 7 with the diaphragm 4, and a three-pole potentiometer 9. The potentiometer 9 has two wiper paths 10, 11 in the shape of an arc of a circle that are fixed in position relative to the diaphragm 4, against which paths the wiper contact pairs 14, 15 of a wiper 42 are pretensioned, with these contact pairs being connected with one another by a contact bridge 13. To make the drawing clearer, the potentiometer arm 12 is shown cut open in the vicinity of the wiper contact pairs 14, 15. The housing part 3 on the pressure chamber side has an edge 17 that fits behind a flange 16 of the housing part 1 on a measuring chamber side by a crimp 18. The housing parts 1, 3 are connected with one another in this fashion and the diaphragm 4 is reliably secured in the pressure sensor. In addition, the housing part 3 on the pressure chamber side has a connecting stub 19 for connecting a pressure line, not shown.

With a variable relative pressure between the measuring chamber 5 and the pressure chamber 2, the diaphragm 4 moves and shifts the potentiometer arm 12 of the measuring device 8 by means of the lever 7. As a result, the wiper contact pairs 14, 15 slide over the wiper paths 10, 11. By means of electronics not shown here, electrical signals can thus be generated as a function of the position of the membrane 4. In addition, a characteristic compatibility with known resistance characteristics and hence also a compatibility with the corresponding displays can be achieved. Pressure equalization of the measuring chamber 5 with the environment is achieved by a pressure-equalizing element 20 with a fluorinated resin such as Teflon membrane 21 that is located in the pot-shaped housing lid 6. The Teflon membrane 21 prevents dirt and moisture from penetrating the measuring chamber 5.

In an enlarged view, FIG. 2 shows the stretching of a diaphragm 4 between the housing parts 1 and 3. The housing part 1 on the measuring chamber side and the housing part 3 on the pressure chamber side each have pressing surfaces 22, 23 that directly abut the diaphragm 4. In an area that is located radially outward as viewed from the pressing surfaces 22, 23, the housing part 3 on the pressure chamber side has an annular depression 24 to receive a sealing ring 25 injection-molded on the outer edge of the diaphragm 4. This sealing ring 25 serves for additional sealing of the measuring chamber 5 shown in FIG. 1 from pressure chamber 2. In addition, the diaphragm 4 has on its outer edge a bend 26 that engages the depression 24 of the housing part 3 on the pressure chamber side. This bend 26 simplifies alignment of the diaphragm 4 during assembly and increases the dimensional stability of the diaphragm 4 when it is in the unassembled state.

In an enlarged view, FIG. 3 shows the lever 7 that deflects the potentiometer 9 in FIG. 1. The lever 7 is made in one piece with the potentiometer arm 12 and is secured so that it can pivot around a bearing axis 27 that is perpendicular to the plane of the drawing. The lever 7 is pretensioned by a spring 28 into a zero position of the potentiometer 9. The zero position allows it to be adjusted by a set screw 29. The steepness of the characteristic of the pressure sensor is adjusted by means of a disk 30 that displaces the set screw 29 and hence changes a lever arm.

FIG. 4 shows another embodiment of the pressure sensor designed to measure a relative pressure between two conecting stubs 31, 32. The pressure sensor has a diaphragm 35 stretched between two housing parts 33, 34. In one of the connecting stubs 31, a pressure-equalizing element 37 that has a filter element 36 is provided to protect the measuring device, not fully shown in FIG. 4, against contamination.

Figure 5:
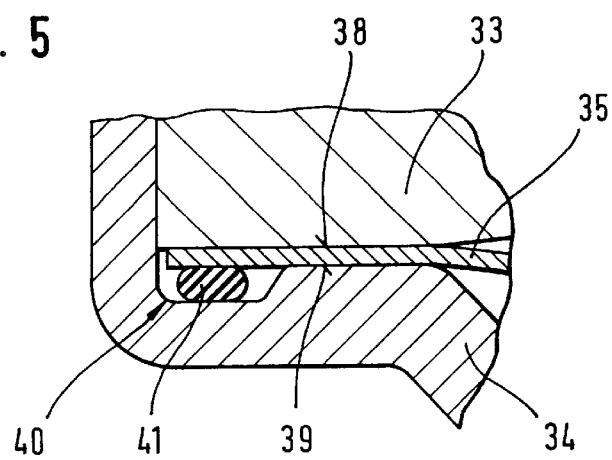
FIG. 5 is an enlarged view of the tensioning of a diaphragm of the pressure sensor in FIG. 4.

FIG. 5 indicates that the diaphragm 35 in FIG. 4 is made flat in its marginal area and is stretched between the two pressing surfaces 38, 39 of the housing parts 33, 34. One of the housing parts 34 has an annular depression 40 to receive a sealing ring 41 that is pretensioned against the diaphragm 35.

We claim:

1. Pressure sensor, suitable for a vehicle, for generating electrical signals as a function of a position of a movable diaphragm comprising:
   a movable diaphragm, a measuring chamber with a first housing part, and a pressure chamber with a second housing part facing said first housing part;
   an electrical measuring device located in said measuring chamber;
   wherein said diaphragm is stretched between said first housing part and said second housing part;
   a portion of said first housing part is elastic to serve as a pressure equalizing element; and
   said measuring device comprises a voltage divider circuit with a potentiometer.

2. Pressure sensor according to claim 1, wherein said potentiometer is a rheostat with a first planar resistance wiper path.

3. Pressure sensor according to claim 2, wherein said rheostat has a wiper, and a second low-ohmage wiper path serving as a contact path for said wiper, said second path being parallel to said resistance wiper path.

4. Pressure sensor according to claim 3, wherein said measuring device further comprises a resistor, wherein said second wiper path is connected with said resistor wired in series.

5. Pressure sensor according to claim 3, wherein said first and said second wiper paths are disposed approximately perpendicularly to said diaphragm.

6. Pressure sensor according to claim 3, wherein said wiper is spring-elastic.

7. Pressure sensor according to claim 6, wherein said wiper has a plurality of wiper fingers, and contacts said first and said second wiper paths with said plurality of wiper fingers.

8. Pressure sensor according to claim 1, wherein said potentiometer has a resistor made of conducting plastic.

9. Pressure sensor according to claim 1, wherein said potentiometer has a sheet resistance.

10. Pressure sensor according to claim 9, wherein said sheet resistance is a thick-layer resistance.

11. Pressure sensor according to claim 1, wherein said measuring device, as a function of a deflection of and with an applied supply voltage of approximately 5 V, delivers an output signal voltage of approximately 0.5 to 4.5 V.

12. Pressure sensor according to claim 1, wherein each of said first housing part and said second housing part, on each of their sides facing said diaphragm, have annularly projecting pressing surfaces.

13. Pressure sensor according to claim 12, wherein said diaphragm directly abuts the pressing surfaces of said first and said second housing parts.

14. Pressure sensor according to claim 1, further comprising a crimp, wherein one of said housing parts has a flange and the other of said housing parts has a surrounding edge which fits behind said flange with said crimp.

15. Pressure sensor according to claim 1, further comprising a lever adjustment element, and a lever which transmits movement of the diaphragm to said measuring device
   wherein said lever is adjustable in terms of its tilt angle and of the length of a lever arm by said adjustment element.

16. Pressure sensor, suitable for a vehicle, for generating electrical signals as a function of a position of a movable diaphragm comprising:
   a movable diaphragm, a measuring chamber with a first housing part, and a pressure chamber with a second housing part facing said first housing part;
   an electrical measuring device located in said measuring chamber;
   wherein said diaphragm is stretched between said first housing part and said second housing part;
   said measuring device comprises a voltage divider circuit with a potentiometer;
   each of said first housing part and said second housing Part, on each of their sides facing said diaphragm, have annularly projecting pressing surfaces;
   wherein said diaphragm directly abuts the pressing surfaces of said first and said second housing parts; and
   said sensor further comprises a sealing ring and, wherein one of said housing parts has a depression to receive said sealing ring pretensioned against said diaphragm.

17. Pressure sensor according to claim 16, wherein said sealing ring surrounds an outer edge of said diaphragm.

18. Pressure sensor according to claim 16, wherein said sealing ring encircles a center of said diaphragm.

19. Pressure sensor according to claim 14, wherein said diaphragm has a bend that engages the depression.

20. Pressure sensor, suitable for a vehicle, for generating electrical signals as a function of a position of a movable diaphragm comprising:
   a movable diaphragm, a measuring chamber with a first housing part, and a pressure chamber with a second housing part facing said first housing part;
   an electrical measuring device located in said measuring chamber;
   wherein said diaphragm is stretched between said first housing part and said second housing part;
   said measuring device comprises a voltage divider circuit with a potentiometer; and
   a pressure-equalizing element which is located in said first housing part facing said measuring chamber, said pressure-equalizing element closing off the interior of said first housing part from the external environment.

21. Pressure sensor, suitable for a vehicle, for generating electrical signals as a function of a position of a movable diaphragm comprising:
   a movable diaphragm, a measuring chamber with a first housing part, and a pressure chamber with a second housing part facing said first housing part;

an electrical measuring device located in said measuring chamber;

wherein said diaphragm is stretched between said first housing part and said second housing part;

said measuring device comprises a voltage divider circuit with a potentiometer;

said sensor further comprises a pressure-equalizing element which is located in a housing of said measuring chamber; and wherein said pressure-equalizing element has an elastic diaphragm.

22. Pressure sensor, suitable for a vehicle, for generating electrical signals as a function of a position of a movable diaphragm comprising:

a movable diaphragm, a measuring chamber with a first housing part, and a pressure chamber with a second housing part facing said first housing part;

an electrical measuring device located in said measuring chamber;

wherein said diaphragm is stretched between said first housing part and said second housing part;

said measuring device comprises a voltage divider circuit with a potentiometer;

said sensor further comprises a pressure-equalizing element which is located in a housing of said measuring chamber; and wherein said pressure-equalizing element includes a filter element.

23. Pressure sensor, suitable for a vehicle, for generating electrical signals as a function of a position of a movable diaphragm comprising:

a movable diaphragm, a measuring chamber with a first housing part, and a pressure chamber with a second housing part facing said first housing part;

an electrical measuring device located in said measuring chamber;

wherein said diaphragm is stretched between said first housing part and said second housing part;

said measuring device comprises a voltage divider circuit with a potentiometer;

said sensor further comprises a pressure-equalizing element which is located in a housing of said measuring chamber; and wherein said pressure-equalizing element comprises a fluorinated resinous membrane.

24. Pressure sensor, suitable for a vehicle, for generating electrical signals as a function of a position of a movable diaphragm comprising:

a movable diaphragm, a measuring chamber with a first housing part, and a pressure chamber with a second housing part facing said first housing part;

an electrical measuring device located in said measuring chamber;

wherein said diaphragm is stretched between said first housing part and said second housing part;

said measuring device comprises a voltage divider circuit with a potentiometer;

wherein said potentiometer is a rheostat with a wiper and at least one planar resistance wiper path;

said measuring device further comprises a set screw, a pivot, a disk and a lever connected to said diaphragm by the set screw and to said first housing part by said pivot to accomplish a pivoting of said lever upon a displacement of said diaphragm, said lever carrying said wiper for moving said wiper, and said disk enabling adjustment of a position of said set screw relative to said lever for altering a response of the sensor to the pressure.

* * * * *